US006996115B1

(12) United States Patent
Budde et al.

(10) Patent No.: US 6,996,115 B1
(45) Date of Patent: Feb. 7, 2006

(54) NETWORK COMPRISING A PLURALITY OF NETWORK NODES FOR MEDIA ACCESS CHECKS

(75) Inventors: Wolfgang O. Budde, Aachen (DE); Manfred Zinke, Aachen (DE); Peter Fuhrmann, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 959 days.

(21) Appl. No.: 09/868,376

(22) PCT Filed: Oct. 10, 2000

(86) PCT No.: PCT/EP00/10000

§ 371 (c)(1),
(2), (4) Date: Jun. 18, 2001

(87) PCT Pub. No.: WO01/30028

PCT Pub. Date: Apr. 26, 2001

(30) Foreign Application Priority Data

Oct. 19, 1999 (DE) .............................. 199 50 433

(51) Int. Cl.
*H04L 12/56* (2006.01)

(52) U.S. Cl. ...................................... 370/407; 370/240

(58) Field of Classification Search ................ 370/446, 370/407, 240, 241, 242, 243, 248, 249, 402; 710/116

See application file for complete search history.

(56) References Cited

U.S. PATENT DOCUMENTS

| 4,417,334 A | * | 11/1983 | Gunderson et al. | ......... 370/402 |
| 4,428,046 A | * | 1/1984 | Chari et al. | ................. 710/116 |
| 4,694,453 A | * | 9/1987 | Kobayashi et al. | ......... 370/249 |
| 4,700,344 A | * | 10/1987 | Kaino et al. | ................ 370/240 |

OTHER PUBLICATIONS

TTP: Drive by Wire in Greifbarer Nahe, by Dr. S. Poledna et al., Elektronik 14, 1999 pp. 36-43.

* cited by examiner

Primary Examiner—Hassan Kizou
Assistant Examiner—Albert T. Chou
(74) Attorney, Agent, or Firm—Adam Stroud

(57) ABSTRACT

The invention relates to a network comprising a plurality of intercoupled network nodes. Controlled by a bus guardian the network nodes transmit messages during a respectively assigned time slot and receive messages from other network nodes outside this time slot. Each network node comprises a test signal generator which delivers a test signal outside the respectively assigned time slot, and includes a test signal detector which detects outside the respective time slot, after receiving a test signal from at least another network node, that there is a defective circuit portion in the assigned network node and/or in at least another network node.

7 Claims, 4 Drawing Sheets

NETWORK COMPRISING A PLURALITY OF NETWORK NODES FOR MEDIA ACCESS CHECKS

Figure 1:
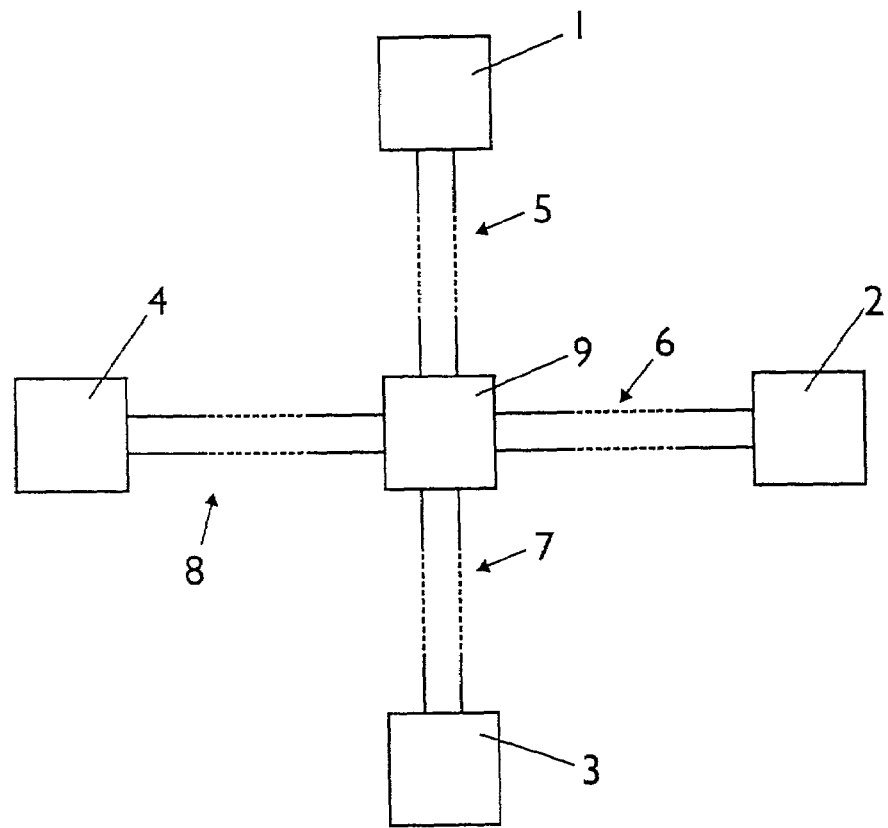

The invention relates to a network comprising a plurality of network nodes. Such networks may be installed, for example, in motor vehicles, in industrial automation (sensor systems) and domestic automation (for example, lighting, alarm systems, heating system, air-conditioning system etc.).

In such a network for motor vehicles can be used, for example, the TTP protocol (TTP=Time-Triggered Protocol) known from the periodical "Elektronik", no. 14, 1999, pp. 36 to 43 (Dr. Stefan Polenda, Georg Kroiss: "TTP: "Drive by Wire" in greifbarer Nähe"). This protocol makes a reliable data transmission possible and may therefore also be used in networks concerning security-relevant devices (for example brakes). Said article mentions a bus system as a network structure.

It is an object of the invention to provide a different network comprising a plurality of network nodes.

The object is achieved by a network of the type defined in the opening paragraph, in that the network nodes, controlled by a respective bus guardian, send messages during an assigned time slot and receive messages outside this time slot, in that each network node contains a test signal generator which delivers a test signal outside the assigned time slot, and in that each network node contains a test signal detector which, after receiving a test signal from at least another network node outside the time slot, detects that there is a defective circuit portion in the assigned network node and/or in at least another network node.

The invention relates to the use of the network in security-relevant applications. For protecting the network against the failure of a node, a check mechanism is inserted for the transmission of messages between the network nodes. This check mechanism is referred to as a media access check and checks, for example, whether a network node sends at the wrong instant or even continuously. A bus guardian in a network node controls the media access. This bus guardian makes it possible, when capable of operating, that the network node can send a message only during a predefined or assigned time slot.

The individual network nodes may be coupled via twisted-pair metallic cables. For example, a bus or star structure may then be used.

During the time not used for the actual transmission of messages, a test signal is then briefly transmitted from one test signal generator to other network nodes, which test signal, if no errors occur, does not even reach the other network nodes due to the bus guardian. A test signal detector then checks whether the transmitted test signal returns to the network node. If it does, the bus guardian may be defective. In this way, the media access is checked in a simple manner with only a test signal without additional line expenditure (cable or optical conductor) between the network nodes.

As defined in claim 2, with a control unit evaluating the detection results can not only be evaluated the operability of the bus guardian in the assigned network node, but also the operability of other network nodes.

If a circuit portion (for example, bus guardian) in a network node has broken down, this is detected by the assigned control unit and the output of the network node is blocked (claim 3). This blocking can be realized, for example, by deactivating a switchable amplifier at the output of the network node.

Claim 4 shows a method of establishing whether a test signal generator is defective. Claim 5 describes a network comprising a plurality of network nodes and a star node in a star structure, in which network messages are transmitted by means of a pilot signal. The pilot signal is generated by a pilot signal generator as defined in claim 6. The pilot signal generator may then also perform the function of test signal generator (claim 7). The test signal detector may also be provided for the detection of the pilot signal generated during the assigned time slot (claim 7).

The invention also relates to a network node in a network comprising a plurality of further intercoupled network nodes.

Figure 2:
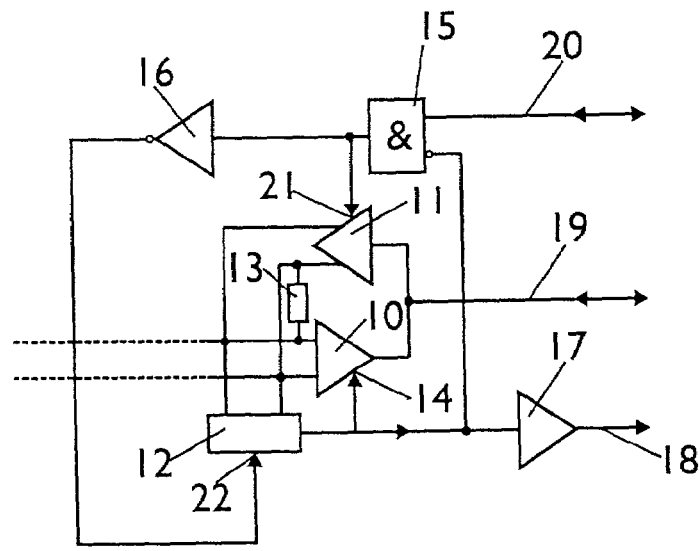
Figure 3:
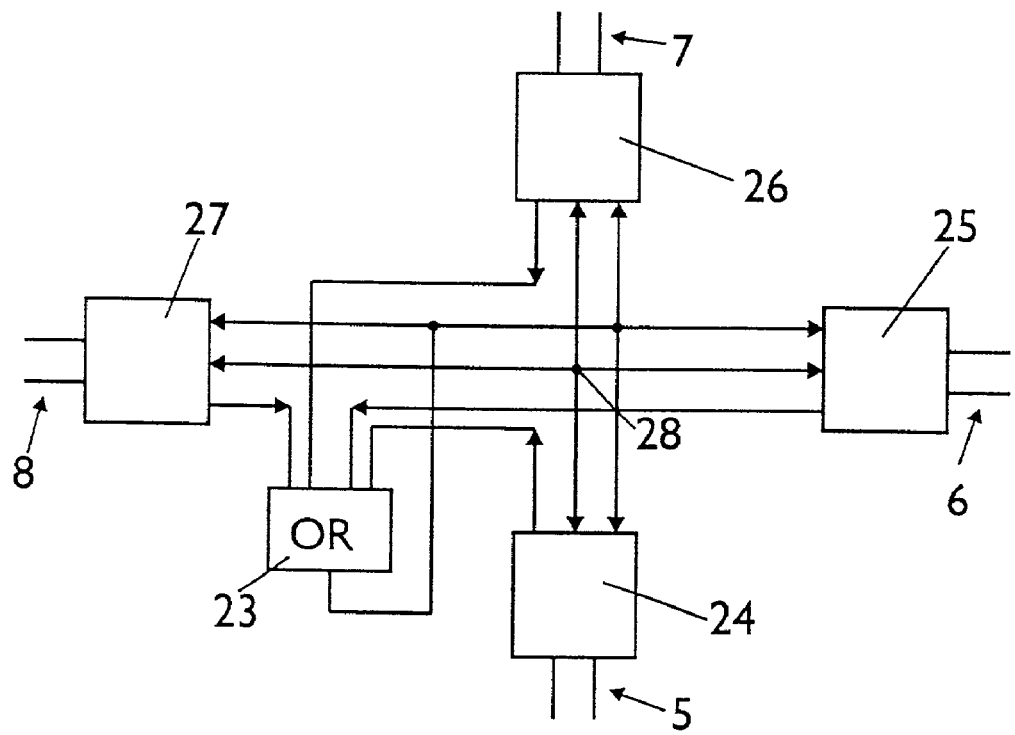
Figure 4:
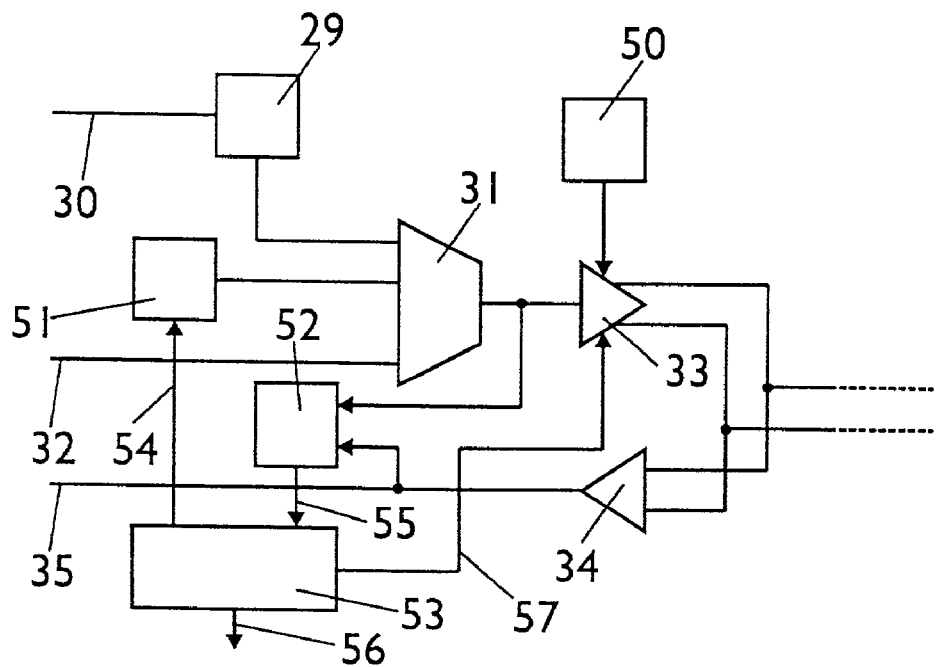
Figure 5:
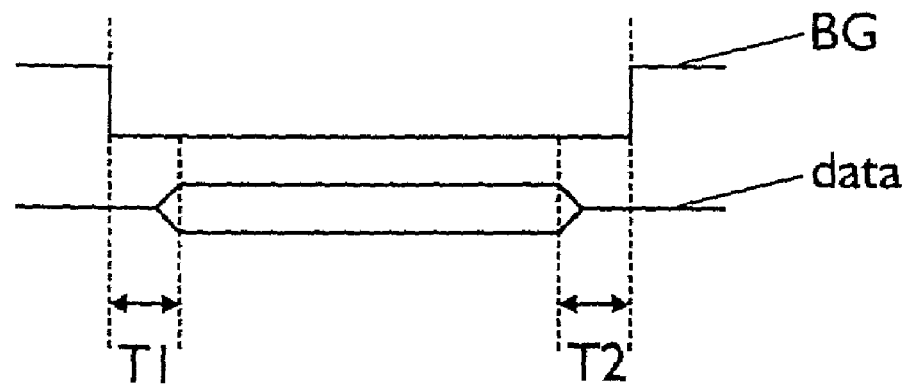
Figure 6:
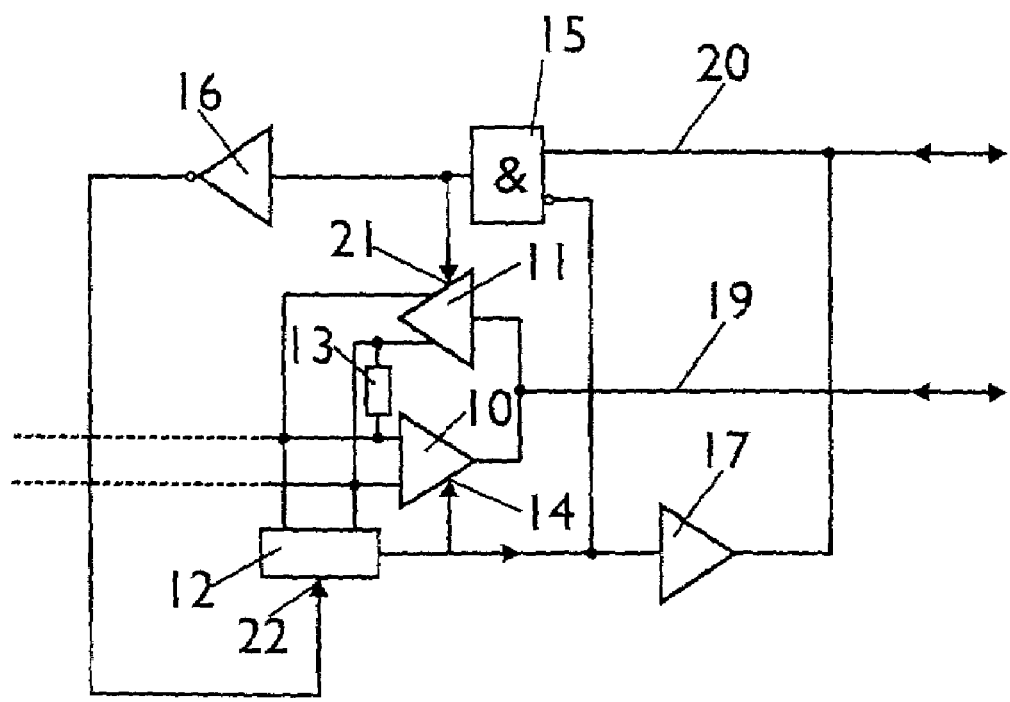
Figure 7:
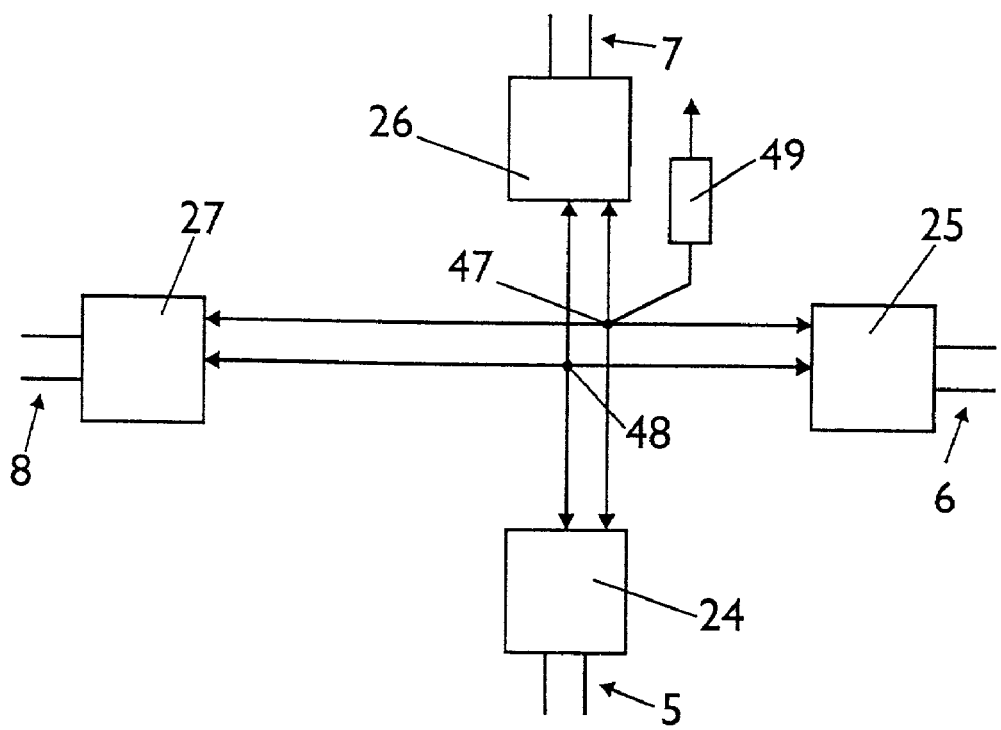
Figure 8:
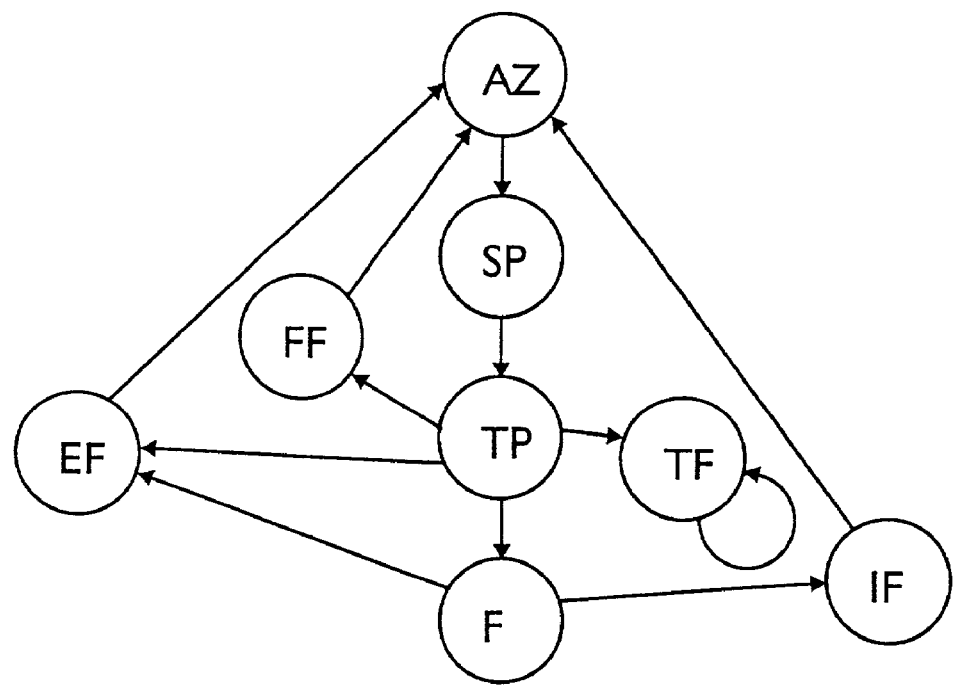

Examples of embodiment of the invention will be further explained with reference to the Figures. In the drawings:

FIG. 1 shows a network in a star structure comprising a plurality of network nodes which are coupled via an active star node, FIG. 2 shows a first embodiment of a star interface in a star node, FIG. 3 shows a first embodiment of a first star node, FIG. 4 shows part of a network node with a pilot signal generator, FIG. 5 shows part of a waveform of two signals in the network, FIG. 6 shows a second embodiment of a star interface in a star node, FIG. 7 shows a second embodiment of a first star node and FIG. 8 shows a state transition diagram for a control unit included in FIG. 4.

An example of embodiment of a network in a star structure is shown in FIG. 1. This network contains, for example, four network nodes 1 to 4, which are intercoupled via an active star node 9 through twisted-pair line pairs 5 to 8 provided for a symmetrical signal transmission. The active star node 9 performs a line adaptation, so that the line pairs 5 to 8 in the active star node 9 are terminated by a wave resistor, and detects a pilot signal transmitted by a network node 1 to 4. If the line pairs 5 to 8 were interconnected without the active star node 9, there would be a mismatch in the star point for each line pair as a result of the impedance jump from $Z_0$ to $\frac{1}{3}Z_0$, which is caused by the fact that the respective other line pairs are connected in parallel. For generating a pilot signal, each network node 1 to 4 further includes a pilot signal generator.

It is also possible to couple the active star node 9 and the network nodes 1 to 4 via optical waveguides. In that case the star node 9 and the network nodes 1 to 4 are to include opto-electrical or electro-optical converters respectively, at the ends of the optical waveguides.

The active star node 9 contains for each line pair 5 to 8 a star interface which enables a transfer of the messages from a transmitting network node to all the other network nodes connected to the active star node. An example of embodiment of such a star interface is shown in FIG. 2. A line pair 5 to 8 is connected to the inputs of a switchable amplifier 10, to the outputs of a further switchable amplifier 11, to a pilot signal detector 12 and to a terminal resistor 13. The resistance of the terminal resistor 13 corresponds to the wave resistance and is therefore used for the correct line termination. When the pilot signal detector 12 detects a pilot signal, it generates a release signal which is led to a switch input 14 of the switchable amplifier 10, to an inverting input of an AND gate 15 and, via an amplifier 17 and a line 18, to an OR gate 23 (FIG. 3). When the switchable amplifier 10 has been released, it supplies data to a data line 19 which leads to a connect node. This data line 19 also receives data from the other star interfaces and transfers them via the switchable amplifier 11 to the assigned line pair. Via a line 20 the non-inverting input of the AND gate 15 is further supplied with a release signal through the OR gate 23, which release signal is produced by another star interface (FIG. 3). The non-inverting output of the AND gate 15 is connected to a switch input 21 of the switchable amplifier 11 and, via an inverter 16, to a release input 22 of the pilot signal detector.

A switchable amplifier 10 or 11 may also be arranged as a series combination of amplifier and switch (switch element). When this switch is closed, the output signal of the amplifier is transferred.

The pilot signal detector detects whether the assigned network node shows, by transmitting the pilot signal, that it intends to transmit messages or data respectively. If this is the case, the amplifier 11 is deactivated (generally it will already have reached this state) and the amplifier 10 is activated or released respectively. The message signal coming from the assigned line pair is led to the line 19 and transferred there to the other star interfaces. Additionally, the release signal generated by the pilot signal detector 12 signals to the other star interfaces that they should activate or release their respective amplifier 11 for transferring the messages to the respective assigned network nodes.

As shown in FIG. 3, the lines 18 of all the other star interfaces are combined in the OR gate 23 FIG. 3 further shows four star interfaces 24 to 27, which are coupled to the line pairs 5 to 8 respectively. The output of the OR gate 23 is connected to the lines 20 (FIG. 2) of the star interfaces 24 to 27. Lines 19 (FIG. 2) of each star interface 24 to 27 are combined via a circuit node 28.

To avoid a signal coming from a line pair 5 to 8 being returned to the same pair, the amplifier 11 is deactivated or switched off via the inverting input of the AND gate 15. On the other hand, to avoid the pilot signal detector assigned to another network node activating its own amplifier 10, the release signal transported over the line 20 (FIG. 2) is used via AND gate 15 and inverter 16 to suppress the release signal for the pilot signal detector 12. This also switches off or deactivates the amplifier 10 via its switch input 14. The pilot signal detector 12, whose pilot signal causes the assigned star interface to receive data, however, remains active for detecting the end of the data transmission.

For the perfect functioning of the active star node 9 it is necessary that the network nodes 1 to 4 transmit their messages not overlapping with time. In addition, it is to be ensured that for the duration of a certain dead time no network node is active or transmits messages or data, respectively. In this state the star node is fully blocked (i.e. all the amplifiers 10 and 11 are deactivated). In this state a star interface 24 to 27 in the star node 9 waits for a new pilot signal, by which a request for transmitting messages is indicated.

Basically, it holds that the pilot signal is always to be transmitted ahead of the beginning of the transmission of the actual message. Only then will be ensured that the active star node 9 is configured in time and that also the beginning of the message reaches all the other network nodes.

FIG. 4 shows in what manner the pilot signal is generated in a network node 1 to 4 and transmitted over a line pair 5 to 8. When a network node wishes to transmit a message or data to other network nodes, a pilot signal generator 29 receives for example a start signal over a line 30. The pilot signal generator 29 then delivers a pilot signal to a multiplexer 31 to which data to be transmitted are supplied via a line 32. The signal produced by the multiplexer 31 is applied to the assigned line pair via an amplifier 32. A signal originating from another network node is led by the line pair via an amplifier 34 onto a line 35 to be further processed.

The multiplexer shown in FIG. 4 may then be arranged both as a time multiplexer (transmission of the pilot signal as a start and a stop signal each time before and after the actual message), or as a frequency multiplexer. This means that the pilot signal may accompany either as a continuous signal the whole message to be transmitted, or can be transmitted in the form of a start and stop signal. For example, as a result of different durations, there may be ensured that the start and stop signal are sufficiently distinguished and the change between transmission time and transmission pause is not mixed up.

The pilot signal may be generated in various ways. One possibility is that it may be a periodic signal, whose frequency range lies outside the frequency range used for the transmission of the messages. This frequency range may lie above or below the useful frequency band, but also lie in "gaps" due to the narrow-band type of the pilot signal when the effective frequency band is specified correspondingly. A further possibility is to transmit the actual message as a symmetrical push-pull signal and the pilot signal as an in-phase signal. The in-phase signal may be in the form of a constant voltage, but also in the form of a periodic signal. A third possibility for the pilot signal is that it is realized in the form of special symbols put before or after the transmitted message.

The network is particularly suitable for use in networks operating according to the TTP protocol for a real-time communication, for example, in a motor vehicle (compare Elektronik, vol. 14/1999: "TTP: "Drive by Wire" in greifbarer Nähe" pp. 36 to 43). With this protocol there is determined, on the one hand, when which transmitter is allowed to transmit with the aid of a conflict-free TDMA access method (TDMA=time-division multiple access) and, on the other hand, a dead time (interframe gap) is defined in which no transmitter is allowed to transmit. This mechanism immediately guarantees that the active star node 9 always goes back to the state of rest. Thus the TDMA method guarantees that always only one network node is allowed to transmit a message at a predefined time and, for this purpose, by means of the pilot signal transmitted by it, activates or causes to activate in the star node the star interface assigned thereto to transfer messages.

An additional advantage is that for controlling the so-called bus guardian, a control signal is to be present in the network node, which signal lies shortly before the beginning of the transmission of the message. This control signal may be used immediately for controlling the pilot signal generator 29 in that this control signal is applied to the pilot signal generator over the line 30.

In FIG. 5 this control signal is referred to as BG and the actual message is referred to as data. The control signal BG is, for example, in a low state during the transmission of the message. During this low state of the control signal the message is to be transmitted. A first time space T1, after a change of the control signal to the low state, and a second time space T2, before a change of the control signal to the high state, are then to be selected, so that the active star node 9 is and continues to be configured correctly for the flawless transmission of the message. It is still to be observed that the TTP protocol supports different (constant) message delay times between various network nodes in the network. So doing, the delay time caused by the active star node 9 does not violate the TTP protocol.

The network according to the invention enables the transmission of a pilot signal with any type of signal transmission of messages from a network node 1 to 4. For example, for the transmission of messages a symmetrical push-pull transmission, single line transmission or carrier frequency-modulated transmission can be selected. With an in-phase coupling of the line pairs 5 to 8 a supply voltage could be transmitted, for example, together with a message.

In lieu of the OR gate 23 required in FIG. 3, this OR combination may also be realized directly by a wired OR combination. A star interface suitable for the wired OR combination is shown in FIG. 6. This star interface as shown in FIG. 6 is identical with the star interface of FIG. 2 except for the switched combination of the output of the amplifier 17. In FIG. 8 the output of the amplifier 17 does not lead to the line 18, but to the line 20 (wired-OR). This provides that the output of the amplifier 17 is connected to the inverting input of the AND gate 15. The amplifier 17 is realized in FIG. 2 as a push-pull amplifier and in FIG. 6 as an open-collector or open-drain amplifier, respectively.

As a result of this wired-OR combination, the cost of wiring is reduced and the OR gate 23 is omitted from the active star node 9 and the network can easily be extended by further network nodes as a result of the omission of the OR gate, which is otherwise to be maintained in some variants. The star interfaces 24 to 27 are in this case connected to the respective lines 19 and 20, so that, as a result, they form two circuit nodes 47 and 48 as shown in FIG. 7. Only one resistor 49 is additionally to be provided, which is coupled, on the one hand, to the circuit node 47 and, on the other, to a supply voltage. Together with the amplifiers 17 of each star interface, this resistor forms the wired-OR combination.

When the network is used in security-relevant applications, an additional control mechanism for the transmission of messages between the network nodes 1 to 4 (media access) is to be inserted to protect the network against the breakdown of a node. More particularly a failure in a way that a node sends at the wrong time or even continuously must certainly be avoided. According to the invention, the failure of the control mechanism in the case of media access is recognized in that for a time not used for the actual transmission of messages a brief, specific violation of the media access rules is faked and thus the functioning of the additional media access control to be described hereinafter (in the case of TTP/C the bus guardian) can be checked. In the time not used for the actual message transmission, a signal is briefly supplied for transmission over a line pair 5 to 8, which signal does not even reach the network if there are no errors, due to the additional media access control (by means of the bus guardian).

The check is made in that, for example, after the actual time slot for the transmission of messages has elapsed, a test signal is transmitted and simultaneously a check is made whether this test signal appears on a line pair. As an instant for the transmission of the test signal may be used, for example, the dead time between the transmission of the messages from various network nodes (between the TDMA time slots).

For realizing this check the circuit portion (FIG. 4) that is provided for generating the pilot signals includes a bus guardian 50, a test signal generator 51, a test signal detector 52 and a control unit 53. The test signal generator 51 delivers a test signal to the multiplexer 31 when this multiplexer 31 receives a release signal from the control unit 53 over a line 54. The test signal is delivered to the line pair via the multiplexer 31 and the amplifier 33. The multiplexer 31 also applies this test signal to the test signal detector 52. The test signal detector 52 has a further connection to the output line 35 of the amplifier 34. The test signal detector 52 delivers the result of the detection to the control unit 53 via lines 55. The control unit 53 delivers to the associated network node status information about a line 56 and a further signal about a line 57 to the amplifier 33 which is arranged as a switchable amplifier. Furthermore, a signal is fed to the amplifier 33 by the bus guardian 50. The amplifier 33 is switched on or activated only when both the bus guardian 50 and the control unit 53 produce signals for activating the amplifier 33.

The control unit 53 causes the test signal generator 51 shown in FIG. 4 to send the test signal for a previously defined period of time after the end of the time slot for the transmission of messages. Simultaneously, the control unit 53 activates its release signal 57 for the amplifier 33. The test signal detector 52 connected to the amplifier 34 in the receiving branch produces the result of the detection which indicates the presence of the test signal in the output signal of the amplifier 34 to the control unit 53 over the lines 55. The result of the detection of the self-test is signaled to the assigned network node in the form of a status signal over lines 56. If the test signal is recognized during the self-test phase in the receiving branch, an error has occurred and the amplifier 33 is permanently deactivated. Otherwise, no error shows up. To ensure that the test signal generator 51 also really generates a test signal, the test signal is also applied to the test signal detector 52 to be checked.

Since the bus guardian is to permit access only during the predefined time slot, the recognition of a test signal on the line pair outside the predefined time slot may be interpreted as an abnormal behavior of the media access controller. By deactivating the amplifier 33 it is avoided that a continuously transmitting network node blocks the star node 9 when the bus guardian has not recognized the error.

The control unit 53 may be arranged, for example, as a state machine, which is supplied with power by its own clock generator. The information about when the access to the medium is allowed or when the predefined time slot for the transmission of the message occurs, is received by the control unit 53 from the assigned network node, which is not shown in detail in FIG. 4. Thus the control unit 53 can perform the media access check independently of the bus guardian. Particularly the case where the clock generator of the bus guardian fails and the bus guardian therefore uninterruptedly allows access to the media, may certainly be recognized in this manner. An embodiment of a state transition diagram of the control unit 53 is shown in FIG. 8.

The state transition diagram of FIG. 8 shows an output state AZ, which changes to a send phase SP when the bus guardian 50 and the control unit 53 activate the switchable amplifier 33 and thus the time slot for transmitting a message from the assigned network node begins. The control unit 53 only supplies a deactivation signal to the amplifier when an error has occurred. When the time slot ends, a change to the test phase is made and a test signal is briefly sent by the test signal generator 51.

If the test signal detector 52 recognizes the test signal on the output of the multiplexer 31 and detects a not allowed test signal on the line 35, there is an error, which is featured by state F in FIG. 8. If the control unit 53 no longer detects a test signal from the test signal detector 52 after it has switched off the test signal (over line 54), there is an internal error (bus guardian defective), which is shown by the status IF. The control unit shows this error as status information and deactivates the amplifier 33 over the line 57.

If the test signal generator 51 is defective, the test signal detector 52 does not detect a test signal on the output of the multiplexer 31. If the test signal detector 52 additionally detects a not allowed test signal on the line 35, there is an external error, which is shown in FIG. 8 by the status EF. A test signal is then detected, although no test signal is generated any longer. This test signal comes from another defective network node.

From status F a transition is made to status EF when the test signal detector 52 (test signal generator 51 is switched off) no longer recognizes a test signal on the output of the multiplexer 31 and when a not allowed test signal is detected on the line 35. This means that the test signal generator 51 functions correctly and another network node is defective.

When the test signal generator 51 is defective, the test signal detector 52 detects during the test phase that there is no test signal on the output of the multiplexer 31. If no test signal occurs on line 35 either (no external error), status TF is changed to. From this status TF a return cannot be made to the output status. The status of the bus guardian can no longer be detected.

If during the test phase TP a test signal has been detected on the output of the multiplexer 31 and no test signal on the line 35, there is an error. This features status FF. After the statuses IF, EF and FF are shown, a return is made to the output status AZ.

In lieu of a test signal it is also possible to use the pilot tone as a test signal. Then it is also possible to recognize the transmission of a continuous pilot tone. In lieu of the test signal generator 51, the pilot signal generator 29 may be used in that case for transmitting the pilot tone as a test signal. The test signal generator 51 may be omitted in that case.

Basically, the test signal may be transmitted at arbitrary instants, that is, immediately before or after the time slot for the transmission of messages, or at an arbitrary other instant in the dead time between time slots.

A further use comprises that also during the time slot for the transmission of messages there may be checked whether the pilot tone necessary for releasing the star interface is generated correctly. This additional check renders the error diagnosis easier, because a distinction may be made between a defective connector line and defective pilot tone generator.

What is claimed is:

1. A network comprising a plurality of intercoupled network nodes, characterized in that the network nodes, controlled by a respective bus guardian, send messages during an assigned time slot and receive messages outside this time slot, in that each network node contains a test signal generator which delivers a test signal outside the assigned time slot, and in that each network node contains a test signal detector which, after receiving a test signal from at least another network node outside the time slot, detects that there is a defective circuit portion in the assigned network node and/or in at least another network node, the test signal detector is also provided for directly receiving the test signal of the assigned test signal generator and in that a control unit in a network node
receives and evaluates the detection results of the test signal detector and
establishes that a circuit portion in the assigned network node is defective when only during the assigned time slot the assigned test signal generator and another network node deliver a test signal and
establishes that a circuit portion in at least another network node is defective when during the assigned and the other time slot at least another network node delivers a test signal.

2. A network as claimed in claim 1, characterized in that the control unit blocks the output of the network node in case of a defective circuit portion in the assigned network node.

3. A network as claimed in claim 1, characterized in that the control unit in a network node establishes that the assigned test signal generator is defective when during the assigned and the other time slot a test signal is delivered neither by the assigned test signal generator nor by another network node.

4. A network comprising a plurality of intercoupled network nodes, characterized in that the network nodes, controlled by a respective bus guardian, send messages during an assigned time slot and receive messages outside this time slot,
in that each network node contains a test signal generator which delivers a test signal outside the assigned time slot, and in that each network node contains a test signal detector which, after receiving a test signal from at least another network node outside the time slot, detects that there is a defective circuit portion in the assigned network node and/or in at least another network node, in that at least part of the network nodes are directly intercoupled via at least one star node,
in that the star node comprises a plurality of star interfaces which are assigned to at least one network node,
in that a respective star interface in dependence on a pilot signal transfers a message from the assigned network node to the other star interfaces or from another star interface to at least one of the assigned network nodes,
in that more than one star interface are assigned to at least one network node, of which only one interface transfers messages in dependence on the status of the assigned network node.

5. A network as claimed in claim 4, characterized in that each network node includes a pilot signal generator which generates either a pilot signal which indicates the whole assigned time slot or the beginning and end of the time slot.

6. A network as claimed in claim 5, characterized in that the pilot signal generator is also used as a test signal generator.

7. A network as claimed in claim 4, characterized in that the test signal detector also detects the pilot signal generated during the assigned time slot.

* * * * *